United States Patent [19]

Dighe

[11] 4,233,549
[45] Nov. 11, 1980

[54] SPEED AND TORQUE CONTROL FOR FRACTIONAL HORSEPOWER MOTORS

[75] Inventor: Kamalakar D. Dighe, Laurel, Md.

[73] Assignee: Baxter Travenol Laboratories, Inc., Deerfield, Ill.

[21] Appl. No.: 967,862

[22] Filed: Dec. 8, 1978

[51] Int. Cl.³ .............................................. H02P 5/16
[52] U.S. Cl. .................................... 318/317; 318/341; 318/345 F
[58] Field of Search .................... 318/317, 341, 345 B, 318/345 F, 246, 345 E

[56] References Cited

U.S. PATENT DOCUMENTS

| 3,195,029 | 7/1965 | Gilbreath | 318/246 |
| 3,854,079 | 12/1974 | Brown | 318/341 |

OTHER PUBLICATIONS

Jung, W. G. "The IC Time Machine", *Popular Electronics*, 11-73, pp. 54-57.
Timers 555,556, Signetics Corp. pp. 18, 1973.

*Primary Examiner*—David Smith, Jr.
*Attorney, Agent, or Firm*—Henry W. Collins; Thomas R. Vigil; Paul C. Flattery

[57] ABSTRACT

Power control circuitry for supplying pulses of power from a power source to a fractional horsepower motor with a plurality of power pulses applied to the motor during each half cycle of the power source waveform for more uniform speed and torque characteristics of the motor at low speeds. A timing capacitor in a motor speed control portion of the circuitry has a constant sum of resistances in the charge and discharge paths for fixed frequency of power pulses applied to the motor. The timing capacitor is electrically connected to a wiper arm of a variable resistor located in both the charge and discharge paths such that resistance may be shifted between the paths to vary the duty cycle of the pulses over a wide range. A pulse generating portion of the circuitry includes a threshold comparator and a trigger comparator to respectively monitor the voltage on the timing capacitor for high or low conditions and cause a bi-stable circuit to change output states upon the occurrence of either condition to generate a train of pulses. The bi-stable circuit is adapted to control the conductive states of transistors in series connection between the motor and the power source to apply repetitive constant-frequency, variable duty cycle pulses of power from the power source to the motor in accordance with the train of pulses. Related methods are also disclosed.

5 Claims, 5 Drawing Figures

SPEED AND TORQUE CONTROL FOR FRACTIONAL HORSEPOWER MOTORS

BACKGROUND OF THE INVENTION

This invention relates to a control circuit for applying power from an electrical power source to a motor to control the motor over a wide range of speeds, and is more particularly concerned with such a power control circuit for applying a plurality of power pulses to a small fractional horsepower motor during each half cycle of the power source waveform with means of varying the duty cycle of the pulses over a wide range to correspondingly vary the speed and torque characteristics of the motor over a wide range without appreciable variation in the frequency of the power pulses.

It is difficult to control the speed of motors of less than one horsepower, and especially of motors less than 0.1 horsepower, particularly at slow speeds, due to the very low moment of inertia of the rotating components of these small motors. Since speed and torque of a motor are directly related variables, operation of the motor at slower speeds results in lower available torque. The control of slow speed operation of small fractional horsepower motors can become particularly acute when the low inertia is combined with other factors such as friction associated with motor brushes on the motor armature, or changes or disturbances in the load driven by the motor.

Various electronic circuits have been proposed to provide better control over multi-speed operation of motors. Thyristors, also known as silicon controlled rectifiers (SCRs), have been widely used for such purposes. Thyristors are most commonly utilized to pulse-width modulate the power source waveform to apply a selected portion of the power source waveform to control the motor speed or torque characteristics. However, since the torque output of motors controlled by thyristors, especially at less than half of rated speed, is directly proportional to the speed of the motor and to the current through the motor, thyristors are ineffective in controlling these motors at low speeds. This characteristic inability of thyristor control circuits to enable the motor to provide more uniform torque or to deliver more torque at lower speeds is independent of whether the thyristors are electrically connected to the motor in half-wave or full-wave bridge configurations.

Another disadvantage of thyristor controlled motors is that the power begins to be applied to the motor at a specific phase angle during the half cycle of the power source waveform and continues to be applied until the power source waveform changes from positive to negative or vice versa. At lower motor speeds, the power is typically applied to the motor for only a small portion of the half cycle of the power source waveform such that the motor has no power for 75 to 90 percent, or more, of the half cycle. For example, in a conventional 60 Hertz power source and with a half-wave thyristor control circuit, the motor may typically be without power for 10 to 15 milliseconds (ms.). These repetitive delays between energization of the motor, coupled with the low moment of inertia of fractional horsepower motors, cause such motors to rapidly decelerate or even stop between the applied power pulses. Despite the claims to a wide range of control over the motor speed, for example a range of 100 to 1, thyristor control circuits seldom exceed a practical range of speed control exceeding a range of 10 to 1 in small fractional horsepower motors.

Of course, thyristors are seldom used in D.C. circuits because of the difficulty and special techniques which must be used to stop current conduction in the thyristor. Transistors have been employed in such circumstances, and in A.C. circuits as well. Some of the transistor circuits attempt to regulate the amount of voltage applied to the motor and must therefore withstand high power dissipation at low speeds.

It is also known to the prior art to use transistors in motor control circuitry to apply pulses of power to the motor windings at frequencies above the usual power source frequency, as in variable speed stepping motors, to obtain incremental changes in motor position. These types of circuits employ either variable frequency pulse sources or vary the duty cycle of the pulses in a manner which causes the frequency of the pulses to change with change in the duty cycle. For example, one technique is to keep the on or off time of the pulse constant and to vary the duty cycle by increasing or decreasing the off or on time. This causes change in the period of the pulse, and hence the frequency.

In contrast, the present invention avoids appreciable power switching losses in the semiconductors which occurs at higher frequencies and applies a uniform number of power pulses to the motor during each half cycle of the power source waveform. It is therefore important to operate at a fixed frequency, such as a multiple of the power source frequency, and to vary the duty cycle of the constant frequency pulses, rather than varying the frequency of the pulses.

SUMMARY OF THE INVENTION

The present invention is directed to a power control circuit for supplying power from an electrical power source to a motor to control the speed of the motor over a wide range of speeds and to especially provide improved speed and torque characteristics in fractional horsepower motors at slow motor speeds. In particular, a plurality of power pulses of fixed frequency are applied from the power source to the motor during each half cycle of the power source waveform with control over the torque and speed characteristics of the motor obtained by varying the duty cycle of the pulses through a wide range, for example 1,000 to 1.

Electronic switch means are in series connection between the motor and either an A.C. or D.C. power source. The switch means are responsive to a train of pulses to periodically and alternately be rendered conductive and non-conductive according to the duty cycle of the pulses to thereby apply pulses of power of corresponding duty cycle from the power source to the motor. The electronic switch means may be arranged in a bridge in A.C. circuits to apply pulses of power to the motor during both positive and negative portions of the power source waveform.

Motor speed control means is adapted to vary the duty cycle of a train of constant frequency pulses generated by the pulse generating means over a wide range, for example 1,000 to 1, without altering the frequency of the train of pulses. The motor speed control means includes a timing capacitor, a resistive charging path in series connection with the capacitor to a relatively stable D.C. voltage for charging the capacitor toward the potential of the D.C. voltage, and a resistive discharging path in generally parallel connection to the capacitor and adapted to discharge current from the capacitor.

The resistive discharging path is further adapted to divert the charging current from the charging path when the resistive discharging path is periodically discharging current from the capacitor. An important feature of the motor speed control means is that the total sum of resistances in the resistive charging and discharging paths remains constant. The constant sum of resistances in the charging and discharging paths is accomplished by a variable resistor having opposite resistive ends connected to respective portions of the charging and discharging paths, with the timing capacitor being connected to the wiper arm of the variable resistor. Movement of the wiper arm thereby changes the resistance in both the charging or discharging paths by effectively shifting resistance from the charging path to the discharging path, or vice versa. However, the total sum of resistance in the charging and discharging paths remains constant such that the period of one complete charge and discharge cycle remains constant and hence the frequency also remains constant. If the variable resistor comprises most of the sum of resistance in the charging and discharging paths, movement of the wiper arm between extreme end positions can cause a wide variation in the charging or discharging time.

The pulse generating means includes a bi-stable circuit adapted to control the conductive or non-conductive states of the electronic switch means, a threshold voltage comparator for monitoring the voltage on the timing capacitor of the motor speed control means with an output of the threshold voltage comparator adapted to set the bi-stable switch means to a state which renders the electronic switch means conductive upon the capacitor voltage exceeding a predetermined threshold voltage, and a trigger voltage comparator adapted to monitor the voltage of the timing capacitor of the motor speed control means with an output of the trigger comparator adapted to reset the bi-stable switch means when the voltage on the timing capacitor is less than another predetermined voltage to thereby render the electronic switch means non-conductive. The power control circuit further includes switchable discharge means connected in the resistive discharge path of the motor speed control means. The switchable discharge means is rendered conductive upon the threshold voltage comparator detecting the capacitor voltage exceeding the threshold voltage to begin discharging current from the capacitor through the discharge path and to simultaneously begin diverting charging current from the resistive charging path. The switchable discharge means is again rendered non-conductive upon the trigger voltage comparator determining that the capacitor voltage is below the trigger voltage, whereupon the timing capacitor can begin recharging through the resistive charging path.

The present invention is further capable of controlling the speed and toque characteristics of fractional horsepower motors from either A.C. or D.C. power sources.

BRIEF DESCRIPTION OF THE DRAWINGS

The features of the present invention, which are believed to be novel and patentable, are set forth with particularity in the appended claims. The invention, together with the further advantages thereof, can best be understood by reference to the following description taken in conjunction with the accompanying drawings, in the several figures in which like reference numerals identify like elements, and in which:

DESCRIPTION OF THE PREFERRED EMBODIMENT

Figure 1:
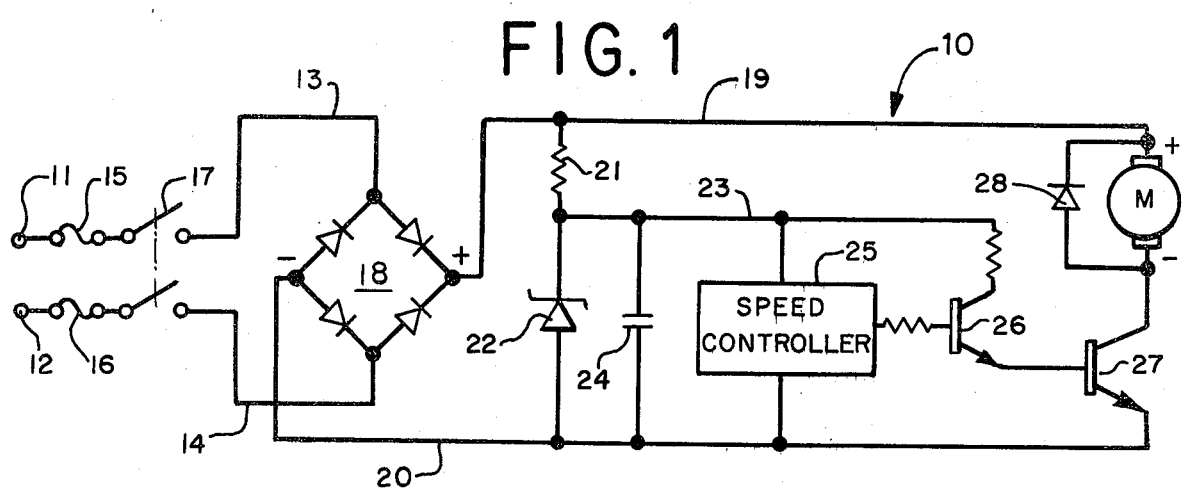
FIG. 1 is an electrical schematic diagram, partially in block form, illustrating the power control circuit of the present invention adapted to control a motor which is energized from a pulsating D.C. power source.

Referring to FIG. 1, there is illustrated a power control circuit, generally designated 10, for supplying power to a motor M from an electrical power source (not shown), but connected to a pair of input terminals 11, 12. A pair of input lines 13, 14 from the respective input terminals 11, 12 are protected from excessive currents by conventional fuses 15, 16, and a double-pole single-throw switch 17 controls the application of input power to the circuit 10 in a conventional and known manner. A full-wave rectification diode bridge 18 across the input lines 13, 14 converts the input A.C. power across lines 13, 14 to pulsating D.C. power across circuit lines 19, 20 with line 19 being positive with respect to line 20. The series combination of a resistor 21 and a zener diode 22 is connected across D.C. lines 19, 20. Zener diode 22 provides a stable D.C. voltage at line 23 and a capacitor 24 in parallel connection with zener diode 22 provides filtering of the D.C. voltage on line 23.

A speed controller 25, which is presented and discussed in greater detail hereinafter, operates from the D.C. voltage on line 23. The primary function of the speed controller 25 is to control the conductive state of a transistor 26. Transistor 26 is connected to a switching transistor 27 which is alternately and periodically rendered fully conductive or non-conductive to apply recurrent pulses of power from line 19 to motor M. A diode 28 in parallel connection with motor M in the collector circuit of transistor 27 provides a path for the inductive energy of motor M when transistor 27 assumes a non-conductive state. Application of excessive negative voltage to the collector of transistor 27, caused by the inductance of motor M, is thereby avoided.

Figure 2:
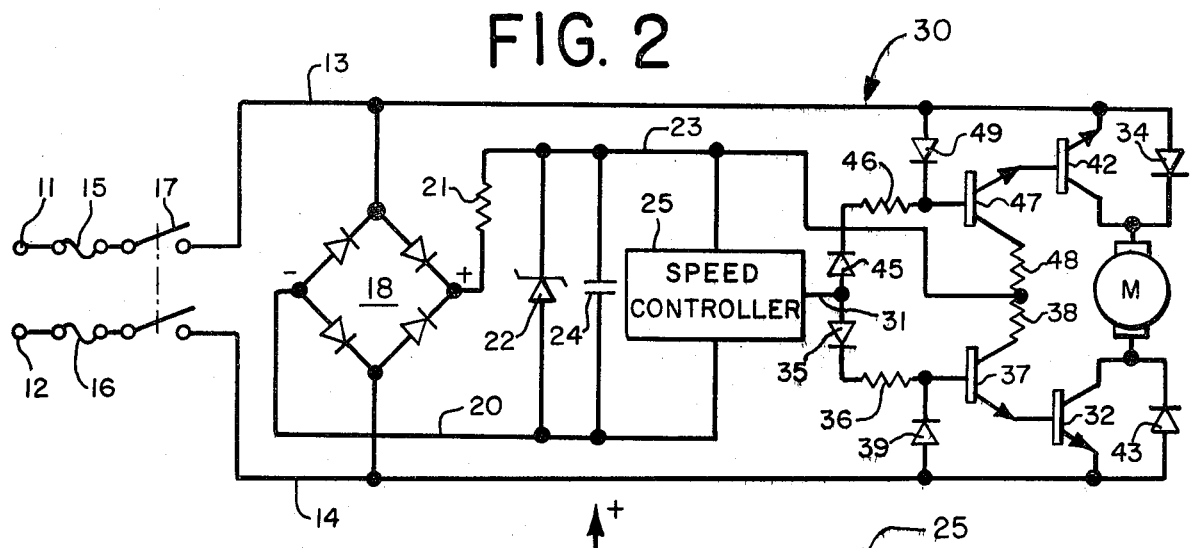
FIG. 2 is an electrical schematic diagram, also partially in block form, related to FIG. 1, but illustrating a different embodiment of the power control circuit of the present invention adapted to drive a motor from an A.C. power source.
Figure 3:
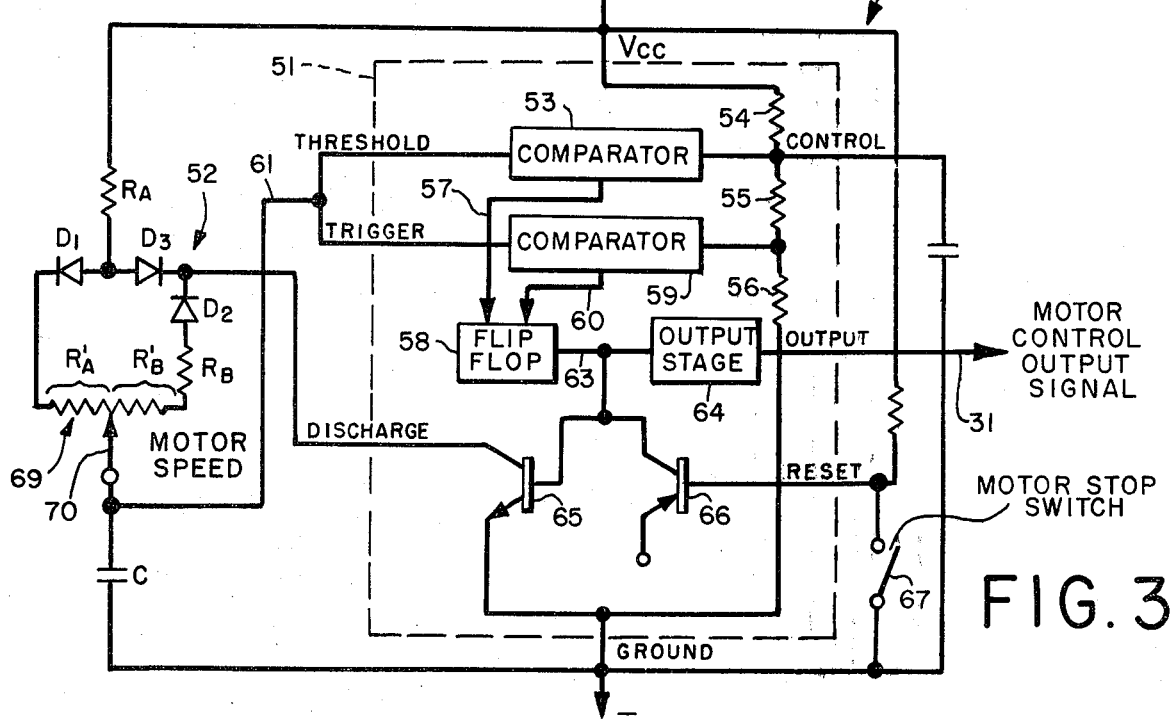
FIG. 3 is an electrical schematic diagram, partially in block form, illustrating the preferred embodiment of the speed controller block in FIGS. 1 and 2 which includes the motor speed control means and the pulse generating means of the power control circuit.

The embodiment of the invention illustrated in FIGS. 2 and 3 constitutes the preferred embodiment of this invention. In a manner similar to FIG. 1, an A.C. power source (not shown) is applied to input terminals, 11, 12 of the power control circuit 30 shown in FIG. 2. Separate fuses 15, 16 for the respective lines 11, 12 provide overcurrent protection, and the double-pole single-throw switch 17 controls application of A.C. power to circuit 30. Input A.C. power across lines 13, 14 is full-wave rectified by diode bridge 18. The filtering action of resistor 21 and capacitor 24, in combination with zener diode 22, provide a stable D.C. voltage between lines 23, 20 with line 23 positive relative to line 20. The stable D.C. voltage across lines 23, 20 is used to power the speed controller circuit 25.

Unlike the power control circuit 10 of FIG. 1, power control circuit 30 of FIG. 2 is adapted to apply periodic pulses of A.C. power from input A.C. lines 13, 14 to motor M. Speed controller circuit 25 has an output terminal 31 for controlling power to motor M during either positive or negative phases of the A.C. power across the lines 13, 14. During that portion of the cycle when line 13 is positive relative to line 14, the speed controller 25 periodically controls the conductive state of a power switching transistor 32 to apply pulses of power through a path between lines 13, 14 defined by the series connection of a diode 34, motor M, and transistor 32. Transistor 32 is rendered conductive by base current supplied through another path defined by a diode 35 connected to output terminal 31 of the speed controller 25, a current limiting resistor 36, and a transistor 37. The base of transistor 32 is driven by the emitter of transistor 37 in the well-known Darlington configuration for high current gain to fully saturate transistor 32 during conductive states. Current in transistor 37 is limited by a collector resistor 38 connected to D.C. line 23. A diode 39 connected in parallel across the base-emitter junctions of transistors 32, 37 is poled to limit the reverse EMF applied to transistors 32, 37 when line 13 is negative relative to line 14, and diode 35 prevents reverse biasing of the output terminal 31.

When line 13 is negative relative to the A.C. line 14, speed controller 25 renders a power switching transistor 42 conductive to periodically apply pulses of power to motor M through a path defined by the series connection of a diode 43, motor M and transistor 42. The speed controller circuit 25 renders power switching transistor 42 conductive by supplying current through another path defined by a diode 45, a current limiting resistor 46 and a transistor 47. The emitter of transistor 47 is connected to the base of transistor 42 in a Darlington configuration for high current gain to fully saturate transistor 42 during conductive periods. A collector resistor 48 associated with transistor 47 is connected to the D.C. line 23 to limit current conducted by the transistor. A diode 49 connected in parallel with the base-emitter junctions of transistors 42 and 47 limits the reverse biasing of these junctions to protect transistors 42, 47 when A.C. line 13 is positive relative to line 14. Diode 45 is reverse biased and therefore non-conductive when line 13 is positive relative to line 14 to prevent interference with control of the conductive state of transistor 32 by speed controller 25. It will also be appreciated that diode 34 provides a path for the inductive energy of motor M when transistor 42 assumes periodic non-conductive states. Similarly, diode 44 provides an inductive current path for motor M when transistor 32 is periodically rendered non-conductive.

The power control circuit 30 of FIG. 2 thus applies recurrent pulses of power from A.C. input lines 13, 14 to motor M during either positive or negative phases of the A.C. power source.

Figure 5:
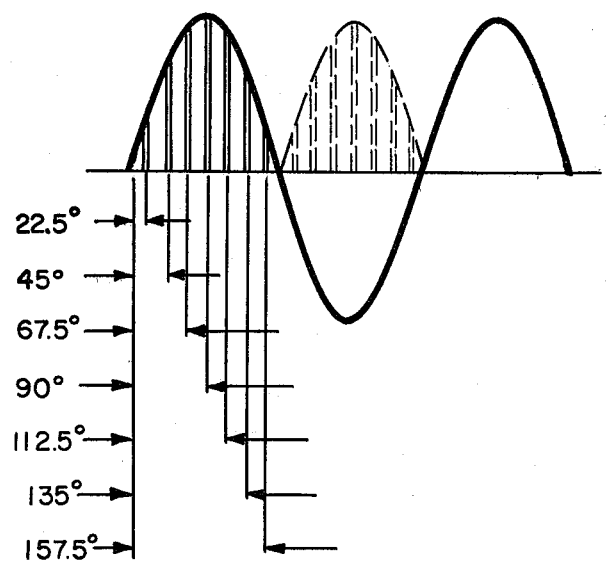
FIG. 5 is a graphic illustration of the power source waveforms, similar to FIG. 4, but illustrating the plurality of constant frequency power pulses which are applied to the motor by the power control circuitry of the present invention during each half cycle of the power source waveform.

The preferred embodiment of speed controller 25, which is shown in block form in FIGS. 1 and 2, is schematically illustrated in FIG. 3. Speed controller 25 is subdivided into two portions, a pulse generating portion 51 contained within the dashed lines in FIG. 3 and a motor speed control portion 52 generally contained outside of the dashed lines. Pulse generating portion 51 is commercially available as an integrated circuit under the general designation "555 Timer" from a number of semiconductor manufacturers, including the Signetics Corporation, Sunnyvale, Calif. In accordance with one aspect of the invention, speed controller 25 generates a train of pulses having a predetermined and fixed frequency such that the period between adjacent pulses is constant. The fixed frequency of the train of pulses is significantly greater than the frequency of the A.C. power source. For example, but not by way of limitation, for a 60 Hertz power source, the frequency of pulses generated by the speed controller could be sixteen times greater than the line frequency, or 960 Hertz, such that each pulse would be 22½ degrees separated from an adjacent pulse, as illustrated in FIG. 5.

Speed controller 25 is also adapted to vary the duty cycle of the train of pulses over a wide range, for example, but not by way of limitation, 1,000 to 1. It is important to the invention that the duty cycle of the train of pulses be varied without altering the frequency of the train of pulses. The advantage of such speed controller operation will become more apparent hereinafter.

The pulse generating portion 51 of speed controller 25 illustrated in FIG. 3 provides several functions to generate the constant-frequency, variable duty-cycle train of pulses. A threshold voltage comparator 53 monitors the voltage on a timing capacitor C in motor speed control portion 52 against a fixed reference voltage established by a resistor divider network including resistors 54, 55, 56. Typically, the reference voltage for threshold voltage comparator 53 will be two-thirds of the supply voltage $V_{cc}$ with resistors 54, 55, 56 of approximately equal resistance. Upon sensing a voltage on capacitor C in excess of the threshold reference voltage, comparator 53 will change in output state on a line 57 to cause a bi-stable circuit, such as a flip flop 58, to similarly change state.

A trigger voltage comparator 59 monitors and compares the voltage on timing capacitor C, but against a trigger reference voltage established by resistive divider 54, 55, 56, which is equal to approximately one third of the positive supply voltage $V_{cc}$. Upon sensing a voltage on timing capacitor C of less than the trigger reference voltage, trigger comparator 59 will change in output state on a line 60 to change flip flop 58 in output state opposite to that caused by threshold comparator 53. Each of the comparators 53, 59 monitor the voltage on capacitor C from a common line 61.

Flip flop 58 has an output line 63 connected to an output driving stage 64 which in turn has an output line 31 adapted to control the driving transistors for motor M. Output line 63 of flip flop 58 is also adapted to control a discharge transistor 65 to begin discharging timing capacitor C upon the occurrence of threshold voltage comparator 53 sensing a high voltage on capacitor C. Transistor 65 continues to discharge capacitor C until trigger voltage comparator 59 resets the flip flop 58 to the opposite state.

A reset transistor 66 is biased to begin conducting upon the manual closing of a motor stop switch 67 to override flip flop 58. Discharge transistor 65 then remains in a conductive mode to discharge timing capacitor C and to inhibit output driving stage 64 to prevent the driving transistors from energizing motor M.

In accordance with another aspect of the invention, a motor speed control circuit, generally designated 52, is provided in which the duty cycle of the train of pulses generated by pulse generating circuit 51 may be varied over a wide range without altering the constant frequency of the train of pulses on output line 31. Timing capacitor C is charged from positive supply voltage $V_{cc}$ through a path defined by the series combination of a resistor $R_A$, a diode $D_1$ and a portion $R_A'$ of a variable resistor 69. A discharge path for timing capacitor C is defined by a path defined by the series combination of a portion $R_B'$ of variable resistor 69, a resistor $R_B$, a diode $D_2$ and discharge transistor 65 to ground. Separate charging and discharging paths are thereby provided. When discharge transistor 65 assumes a non-conductive state, the charging interval begins and the time required for capacitor C to reach two-thirds of the positive supply voltage $V_{cc}$, which is equal to the threshold reference voltage, is given by the expression $$T_C = 0.693(R_A + D_1 + R_A')C$$

When the discharge transistor 65 assumes a conductive state, the charging current through resistor $R_A$ is diverted through the previously non-conductive diode $D_3$ and capacitor C begins to discharge toward the trigger reference voltage. The discharge time for capacitor C to discharge to the trigger voltage reference is given by the expression $$T_D = 0.693(R_B' + R_B + D_2)C$$

The total time period, $T = T_C + T_D = 0.693(R_A + R_A' + R_B' + D_1 + D_2)$.

Since timing capacitor C is connected to wiper arm 70 of variable resistor 69, resistor 69 does not change in ohmic value, but portions thereof are shifted to charging portion $R_A'$ or to discharging portion $R_B'$. The total time period, and hence the frequency to complete a charging interval and a discharging interval of timing capacitor C, is therefore constant. However, the duty cycle may be varied over a wide range by movement of wiper arm 70 of variable resistor 69. The duty cycle can be calculated from the expression $$\text{Duty cycle} = \frac{\text{on time}}{\text{total time}} = \frac{R_A + R_A' + D_1}{R_A + R_A' + D_1 + R_B' + R_B + D_2}$$

The minimum duty cycle will occur when wiper arm 70 is set to the extreme left as viewed in FIG. 3 such that portion $R_A'$ of variable resistor 69 which was formerly in the charging path will now be in the discharging path. The minimum duty cycle can therefore be calculated from the expression $$\text{Duty cycle (min.)} = \frac{R_A + D_1}{R_A + D_1 + R_A' + R_B' + R_B + D_2}$$

Conversely, the maximum duty cycle will occur when wiper arm 70 is set to the extreme right as viewed in FIG. 3 such that portion $R_B'$ of variable resistor 69 which was formerly in the discharge path will now be in the charging path. The maximum duty cycle can therefore be calculated from the expression $$\text{Duty cycle (max.)} = \frac{R_A + D_1 + R_A' + R_B'}{R_A + D_1 + R_A' + R_B' + R_B + D_2}$$

If the resistance of variable resistor 69 is considerably greater than resistors $R_A$, $R_B$, and diodes $D_1$, $D_2$, then it can be seen from the above expressions that the duty cycle between the maximum and minimum timings can encompass a broad range without affecting the constant frequency of operation simply by varying the position of wiper arm 70 along variable resistor 69.

Figure 4:
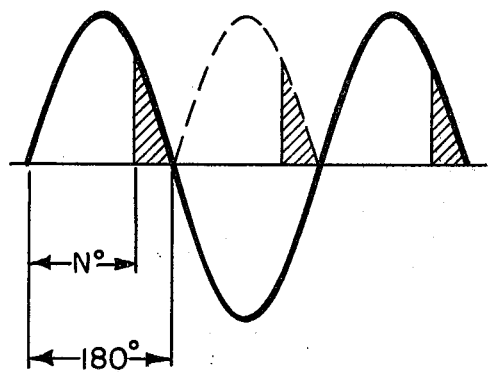
FIG. 4 is a graphic illustration of a sinusoidal A.C. power system waveform, which may be full-wave rectified to provide a pulsating D.C. waveform, and further illustrating the relatively small portion of the power source waveform which is applied to a motor by prior art thyristor motor control circuits when the motor is operating at slow speeds.

While the power control circuitry of the present invention is useful in controlling a wide variety of motors, the invention can be used most advantageously for controlling the speed and/or torque characteristics of small fractional horsepower motors. Motors of less than 0.1 horsepower inherently have a low moment of inertia of the rotating components. As can be best seen from the graphic illustration in FIGS. 4 and 5, the prior art pulse-width modulation of the power source waveform by thyristor type controllers becomes ineffective in controlling fractional horsepower motors at low speeds. Thyristor control circuits, whether arranged in the half-wave or full-wave bridge configurations, deliver significantly less torque at lower speeds, and especially at less than half of rated speeds since the thyristors will not conduct current until a particular phase angle N is reached. Typically the phase angle N for slow speeds will be at least 135° such that the voltage and, hence, power available from the sine waveform of conventional A.C. power sources begins to decrease rapidly toward the zero voltage point at 180°. Thus, the power available for slow speed operation becomes increasingly limited as slower speeds are desired. Of course, since the voltage is decreasing, the current through the motor will correspondingly decrease. However, current decrease is undesirable since torque is directly related to the available current to the motor. Moreover, the motor in the prior art thyristor control arrangements has no power applied thereto for 75 to 90 percent, or more, of the half cycle of the A.C. waveform. With small fractional horsepower motors having very low moments of rotational inertia, in many applications the motor may actually stop between the widely spaced thyristor conduction periods or may seriously decelerate. Even though wide claims have been made for the range of control available with thyristor circuits, the range of speed or torque control for fractional horsepower motors is severely limited.

As is best illustrated in FIG. 5, the power control circuitry of the present invention applies a plurality of power pulses to the motor during each half cycle of the A.C. power waveform to obtain more uniform and improved speed and/or torque characteristics from a fractional horsepower motor. In the graph of FIG. 5, the power control circuitry applies eight pulses per half cycle of the A.C. power source waveform. However, the pulse occurring at 180 degrees is insignificant for small duty cycles since the A.C. waveform is passing through zero voltage. There are therefore effectively seven pulses of voltage applied to the motor M at 22.5 degree intervals.

Since pulses of power are supplied to the motor M throughout the half cycle of the A.C. power source waveform, the motor M will exhibit more uniform speed and torque characteristics at slow speeds. Furthermore, since the power pulses occur throughout the half cycle of the waveform, the voltage near the middle of the half cycle will be considerably greater than that in the prior art thyristor circuits for slow speed motor operation. For example, it can be mathematically shown that seven 100 microsecond pulses distributed uniformly during the half cycle produce many times higher torque than a single 700 microsecond pulse appearing near the end of the half cycle.

Because the present invention utilizes constant-frequency, variable duty-cycle power pulses, which frequency is preferably a multiple of the power source frequency, the variation in the duty-cycle of the pulses does not change the number of pulses appearing in any one half cycle of the A.C. power waveform. Nor do more power pulses appear in one-half cycle of the waveform than in another, as can be the case where the frequency is permitted to vary. Since the power pulses remain in the same relative position of each half cycle of the A.C. power source waveform despite variations in the duty-cycle of the pulses, a higher degree of control over the amount of power applied to the motor can be achieved and the speed or torque characteristics of the motor can be more accurately controlled. Furthermore, circuit components can be selected for optimum operation at the fixed pulse frequency such that transistor power switching losses can be minimized.

It will be readily apparent to those skilled in the art that the power control circuits 10, 30 may be modified. For example, additional negative feedback circuitry could monitor the speed or torque of the motor M and automatically change the duty-cycle of the train of pulses by causing a servo-mechanism to move the wiper arm 70 to a corrected position.

Inherent in the above description of the power control circuit were methods of supplying power from an electrical power source to a motor to control the speed or torque characteristics of the motor over a wide range. The basic steps of the method include generating a train of pulses having a predetermined and fixed frequency such that the period between adjacent pulses is constant, the fixed frequency being above the nominal line frequency of the A.C. power source, varying the duty-cycle of the train of pulses over a range without altering the frequency of the train of pulses, and controlling the conductive state of semiconductors in series connection between the motor and the A.C. power source in response to the train of pulses to apply a plurality of pulses of A.C. power from the A.C. power source to the motor during each half cycle of the A.C. power source waveform.

The step of generating a plurality of pulses during each half cycle of the A.C. waveform of fixed frequency may be accomplished by charging a timing capacitor in potential toward the D.C. voltage supply, monitoring the voltage of the capacitor against a threshold voltage, changing the output state of a threshold voltage comparator to set a bi-stable circuit into a state which renders the power switching transistors conductive and to simultaneously being discharging of the timing capacitor through a discharge path such that the potential of the timing capacitor begins to discharge toward ground potential, monitoring the potential of the capacitor against a trigger voltage, changing output state of a trigger voltage comparator upon the potential of the timing capacitor becoming less than the trigger voltage, resetting the bi-stable circuit to render the power switching transistors non-conductive, and again commencing with charging of the timing capacitor toward the potential of the D.C. voltage supply. Preferably, the additional step of diverting the charging current from the timing capacitor during discharge of the timing capacitor is also utilized.

The step of varying the duty cycle of a train of pulses over a wide range without altering the frequency of the train of pulses is accomplished by moving a wiper arm of a variable resistor, to which the timing capacitor is electrically connected, to effectively shift resistance from the charging path to the discharging path, or vice versa, such that the total sum of resistances in the charging and discharging paths remains constant.

It will be understood that various changes and modifications may be made without departing from the spirit of the invention defined in the following claims.

I claim:

1. A motor speed control system for supplying power from an electrical power source to an electric motor, comprising, in combination:
   a capacitor having one terminal connected to a plane of reference potential;
   a source of unidirectional current of relatively constant voltage;
   means including a capacitor charge circuit serially comprising a first resistor, a first diode, and a second resistor connected between said current source and the remaining terminal of said capacitor, for periodically charging said capacitor;
   means including a capacitor discharge circuit serially comprising a third resistor, a fourth resistor, and a second diode connected between the remaining terminal of said capacitor and said plane of reference potential for periodically discharging said capacitor;
   timing circuit means serially included in said capacitor discharge circuit between said second diode and said plane of reference potential, and including a voltage capacitor responsive to the voltage level across said capacitor for periodically rendering said discharge circuit operative to discharge said capacitor;
   electronic switch means serially connected between the electrical power source and the electric motor and responsive to said timing circuit for applying pulses to said motor having a repetition rate and duty cycle dependent on the charging and discharging of said capacitor;
   means including a diode connected between the juncture of said first resistor and said first diode, and the juncture of said second diode and said timing circuit for disabling said capacitor charge circuit upon operation of said capacitor discharge circuit; and
   said second and third resistors comprising respective sections of a potentiometer having a user-adjustable tap connected to said capacitor whereby the duty cycle of the pulses applied to said electric motor are varied without varying the frequency thereof for smooth speed control of the motor over a wide range of speeds.

2. A motor speed control system as defined in claim 1 wherein the electrical power source is an alternating current source, and the repetition rate of said pulses applied to the electric motor is greater than the frequency of the alternating current source.

3. A motor speed control system as defined in claim 2 wherein said source of unidirectional current comprises a rectifier for converting the alternating current source to a direct current.

4. A motor speed control system as defined in claim 1 wherein said timing circuit means include a first voltage comparitor circuit responsive to the voltage across said capacitor for initiating operation of said charge circuit, and a second voltage comparitor responsive to the voltage across said capacitor for initiating operation of said discharge circuit.

5. A motor speed control system as defined in claim 4 wherein said timing circuit means comprise a monolithic linear integrated timing circuit.

* * * * *